July 11, 1961  H. P. PAIKERT  2,991,962
EXHAUST OPERATED TORQUE REACTOR FOR HELICOPTERS
Filed Aug. 14, 1958
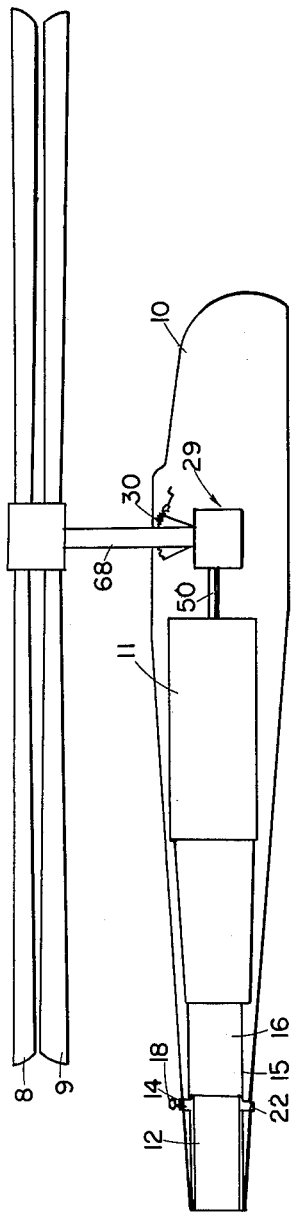
FIG.1
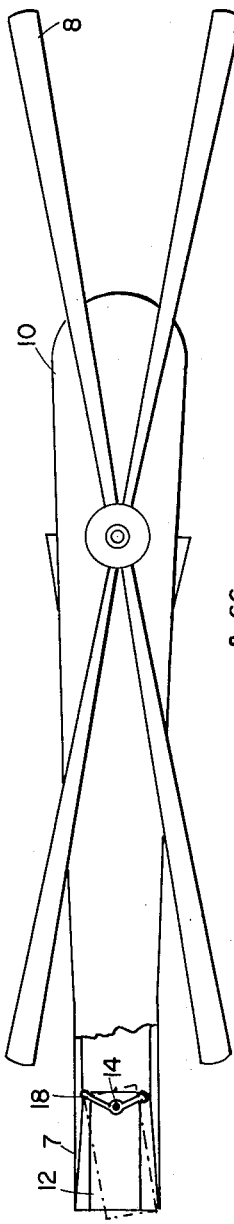
FIG.2
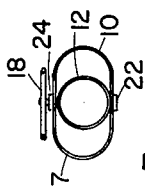
FIG.5
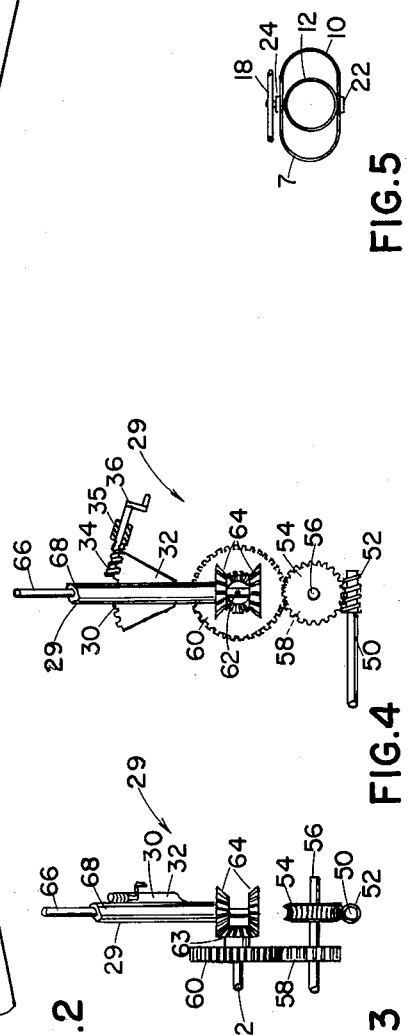
FIG.4
FIG.3
INVENTOR.
Hans Peter Paikert
BY
Peter M. Bown,
ATTORNEY.

United States Patent Office 2,991,962
Patented July 11, 1961

2,991,962
EXHAUST OPERATED TORQUE REACTOR FOR HELICOPTERS
Hans Peter Paikert, 2308 Poplar Drive, Baltimore, Md.
Filed Aug. 14, 1958, Ser. No. 755,001
1 Claim. (Cl. 244—17.19)

This invention relates to an helicopter which is equipped with a turbo jet engine as a prime mover and with a single or counter rotating twin propeller.

One object is to provide for an additional movable exhaust pipe, which will by moving same in a horizontal direction, divert the craft against the thrust torque of the propeller or propellers, as the exhaust gases exert a pressure on the tail end of the craft.

Another object of the invention is to provide a practical transmission between the turbine drive shaft and the propeller shaft with a segmental gear arrangement to be able to tilt the propeller shaft housing forward or backwards as desired by the operator to acquire the altitude desired.

Another object is to provide a combination of a tilting propeller and exhaust jet member so that the propeller can be used to neutralize the forward thrust of the exhaust.

These together with other objects and advantages, which will become apparent, reside in details of the construction and operation as more fully hereinafter described and claimed, reference being had to the accompanying drawings forming a part thereof, wherein like numerals refer to like parts throughout the several views, and in which:

FIGURE 1 is an elevational view of the helicopter.
FIGURE 2 is a vertical view of the helicopter.
FIGURE 3 is a schematic view of the gear shift.
FIGURE 4 is another view of the gear shift; while
FIGURE 5 is a rear view of the exhaust pipe.

Referring to the drawings in detail the illustrated helicopter 10 is provided with propellers 8 and 9 which may run counter to each other or which may be so arranged as to run in the same direction. The propellers have as prime movers a gas turbo jet engine 11. The tail portion of the helicopter opens rearwardly and is of oval cross section to permit an exhaust pipe extension 12 therein to be deflected laterally. This is accomplished by pivoting the extension as at 14 and 22 near the end 15 of the exhaust duct 16. As shown in FIGURE 5, this construction leaves the duct and extension substantially free from any structure to interfere with the exhaust gas. Lateral shifting or deflecting of the exhaust is regulated by a double arm lever 18 controlled by the pilot through suitable means (not shown). As the extension 12 is deflected from one side to the other, the tail of the craft tends to shift in the opposite direction due to the reaction thrust of the exhaust gases. In this manner the torque thrust due to the rotating propellers can be neutralized and the craft stabilized. As shown in FIGURE 5, the outside diameter of the round extension 12 is substantially the same as that of the inside of the tail at its end 24 and smaller diameter so that the tail may steady the extension at the outer end thereof against vertical movement to cause undue wear on the pivotal means 14 and 22.

Another improvement is in means for tilting the propeller shaft or shafts and comprises a gear segment 30 fastened in appropriate manner to the propeller shaft housing 29. For clarity, the housing is shown as the system in FIGURES 3 and 4. A worm 34 engages into the gear segment 30 and is operated by a handle 36 or other means mounted on the body of the craft. By moving the segment to pivot about shaft 62, such control will tilt the propeller shaft housing 29 in either a forward or backward angle relative to the axis of the craft.

As the helicopter is powered by a turbine, a gear reduction is arranged between the turbine and propeller shafts 66 and 68. A worm 52 fastened to the drive shaft 50 of the engine 11 engages a worm gear 54 mounted on a shaft 56 to which is fastened a spur gear 58 engaging in a spur gear 60 mounted on a shaft 62. The shaft 62 at the end of the reducing train is provided with a bevel gear 63 engaging a pair of bevel gears 64 on the respective propeller shafts 66 and 68. As mentioned above the segment 32 can thus rock the propeller shafts about the shaft 62.

While the invention is shown in connection with twin propellers, one propeller and its corresponding shaft and bevel gear may be omitted.

It is obvious that changes may be made in the form, construction and arrangement of the several parts, as shown, within the scope of the appended claim, without departing from the spirit of the invention, and I do not, therefore, wish to limit myself to the exact construction shown and described herein.

What I claim as new, and desire to secure by Letters Patent of the United States, is:

A helicopter comprising at least one lifting propeller and body therewith; the body having a tail portion; an engine for rotating the propeller, an exhaust duct in the tail portion, a cylindrical generally rearwardly open exhaust pipe extention on the exhaust duct and pivoted for lateral movement of the outer end of the extension, the rear end part of the tail portion being of substantially oval cross section and having its smaller diameter substantially equal to that of the outer diameter of the extension to steady same against excessive vertical movement.

References Cited in the file of this patent

UNITED STATES PATENTS

| | | |
|---|---|---|
| 2,192,300 | Droitcour | Mar. 5, 1940 |
| 2,475,786 | Jordan | July 12, 1949 |
| 2,481,749 | Hiller | Sept. 13, 1949 |
| 2,589,030 | Alde | Mar. 11, 1952 |
| 2,765,993 | Custer | Oct. 9, 1956 |
| 2,818,223 | Doblhoff | Dec. 31, 1957 |